United States Patent
Ando

(10) Patent No.: US 11,406,477 B2
(45) Date of Patent: Aug. 9, 2022

(54) ORTHODONTIC DEVICE

(71) Applicant: CHUBU MEDICAL CO., LTD., Ichinomiya (JP)

(72) Inventor: Hiroaki Ando, Ichinomiya (JP)

(73) Assignee: CHUBU MEDICAL CO., LTD., Ichinomiya (JP)

(*) Notice: Subject to any disclaimer, the term of this patent is extended or adjusted under 35 U.S.C. 154(b) by 15 days.

(21) Appl. No.: 17/106,894

(22) Filed: Nov. 30, 2020

(65) Prior Publication Data

US 2021/0077228 A1 Mar. 18, 2021

Related U.S. Application Data

(63) Continuation of application No. PCT/JP2019/005826, filed on Feb. 18, 2019.

(51) Int. Cl.
*A61C 7/14* (2006.01)
*A61C 7/08* (2006.01)

(52) U.S. Cl.
CPC ............ *A61C 7/146* (2013.01); *A61C 7/08* (2013.01)

(58) Field of Classification Search
CPC .. A61C 7/146; A61C 7/08; A61C 7/06; A61C 7/10; A61C 5/82; A61C 7/12
See application file for complete search history.

(56) References Cited

U.S. PATENT DOCUMENTS

| | | | | |
|---|---|---|---|---|
| 4,379,693 A | * | 4/1983 | Wallshein | A61C 7/10 433/7 |
| 5,254,002 A | * | 10/1993 | Reher | A61C 7/141 433/8 |
| 10,045,834 B2 | * | 8/2018 | Gualano | A61C 7/28 |
| 2003/0190575 A1 | | 10/2003 | Hilliard | |
| 2009/0301498 A1 | * | 12/2009 | Nordstrom | A61C 7/08 128/848 |
| 2015/0245887 A1 | | 9/2015 | Izugami et al. | |
| 2015/0305831 A1 | * | 10/2015 | Cosse | A61C 7/146 433/24 |
| 2017/0049535 A1 | | 2/2017 | Izugami et al. | |

FOREIGN PATENT DOCUMENTS

| | | |
|---|---|---|
| JP | 2006-511243 A | 4/2006 |
| JP | 2008-532563 A | 8/2008 |
| JP | 2015-150179 A | 8/2015 |
| JP | 2015-177969 A | 10/2015 |
| KR | 101710840 B1 * | 2/2017 |

(Continued)

OTHER PUBLICATIONS

May 7, 2019 International Search Report issued in International Patent Application No. PCT/JP2019/005826.

(Continued)

*Primary Examiner* — Jacqueline T Johanas
*Assistant Examiner* — Lina Faraj
(74) *Attorney, Agent, or Firm* — Oliff PLC

(57) ABSTRACT

An orthodontic device, including: an inner housing that covers teeth, an outer housing that covers the inner housing, a bracket that is capable of pressing against the teeth and that penetrates the inner housing, and a pressing force adjuster that engages with the outer housing and the bracket and that is capable of adjusting a pressing force of the bracket on the teeth.

18 Claims, 21 Drawing Sheets

(56) References Cited

FOREIGN PATENT DOCUMENTS

KR          101744000 B1    6/2017
WO      2005/092234 A1    10/2005

OTHER PUBLICATIONS

May 7, 2019 Written Opinion of the International Searching Authority issued in International Application No. PCT/JP2019/005826.
Mar. 24, 2022 Office Action issued in Korean Patent Application No. 10-2020-7032610.

* cited by examiner

[FIG.01]
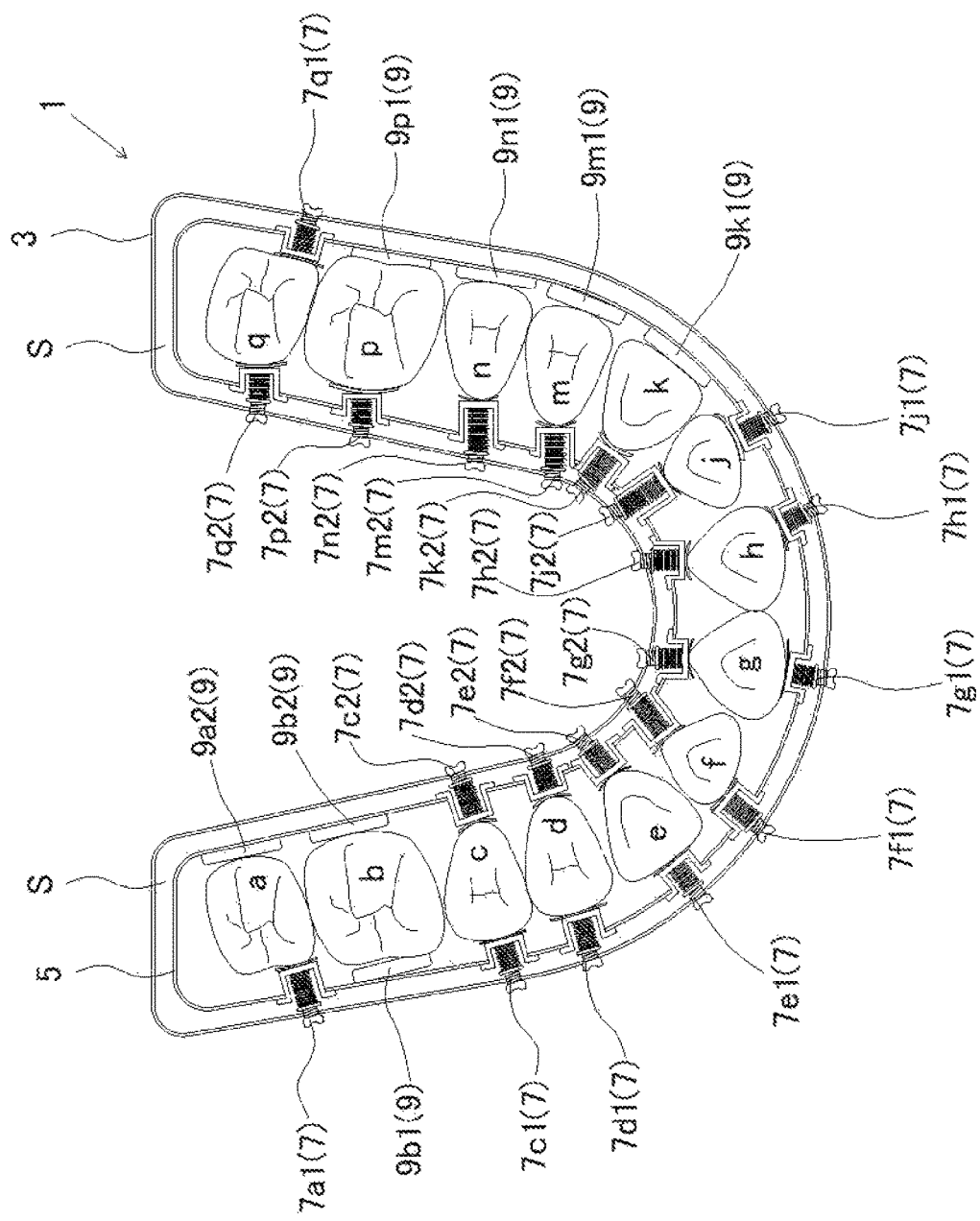

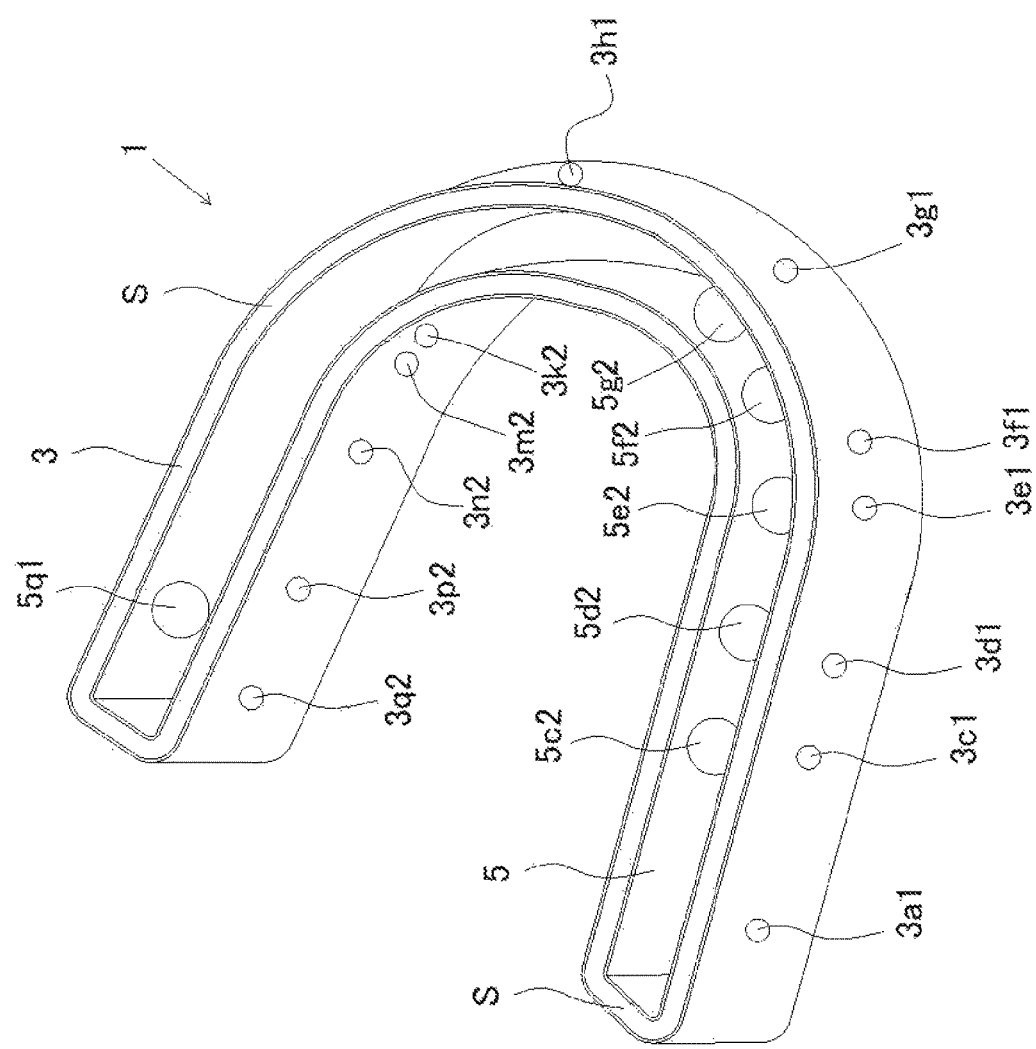
[FIG.02]

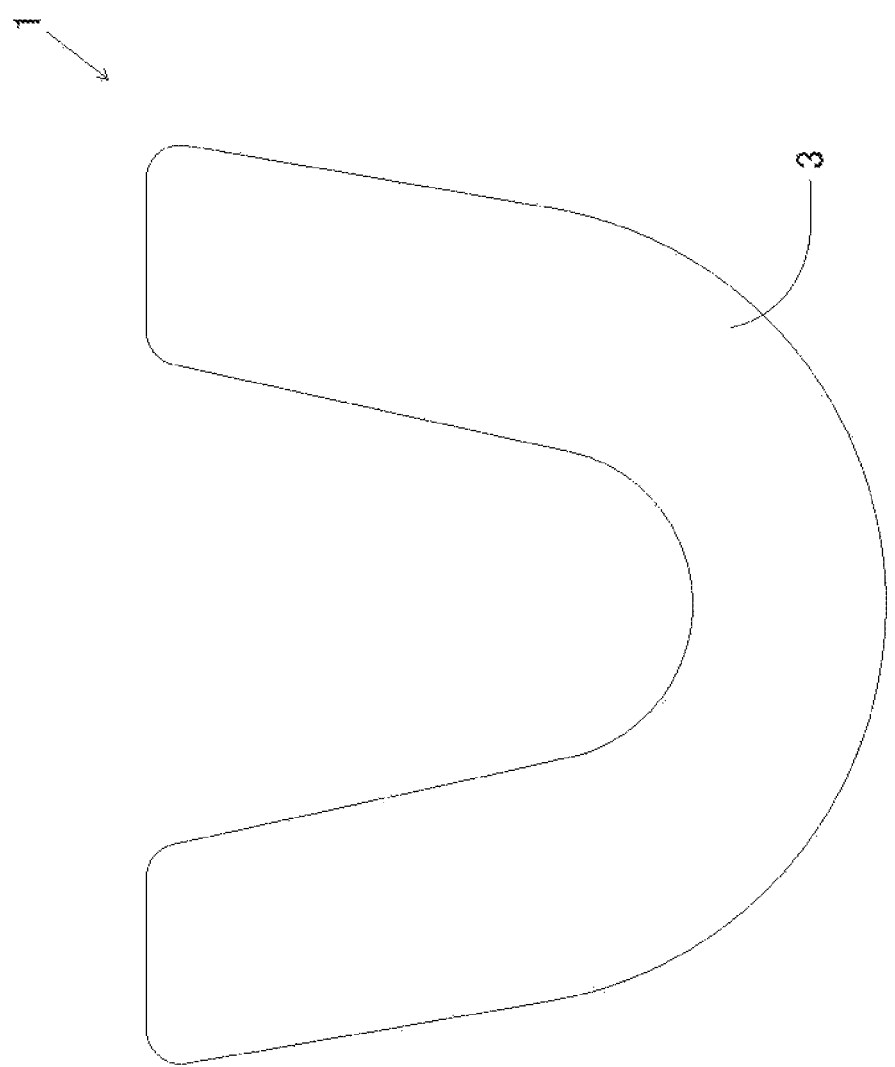

[FIG.04]
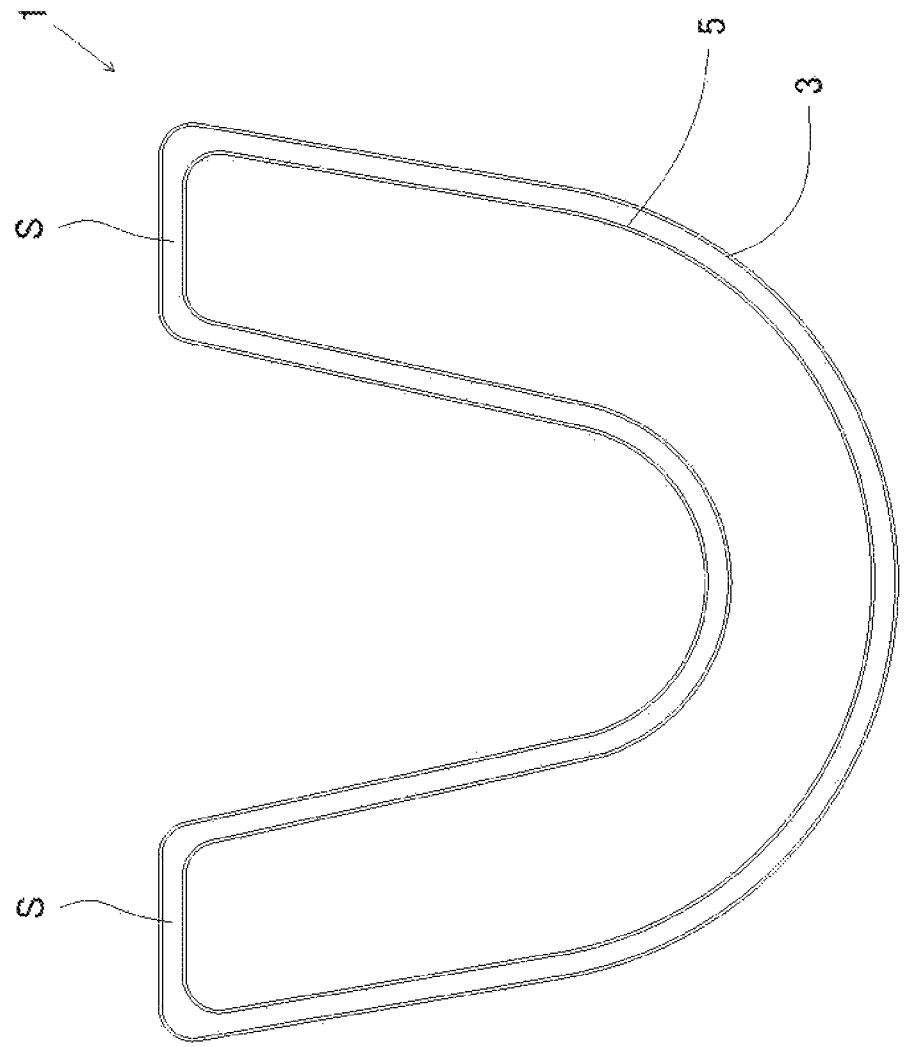

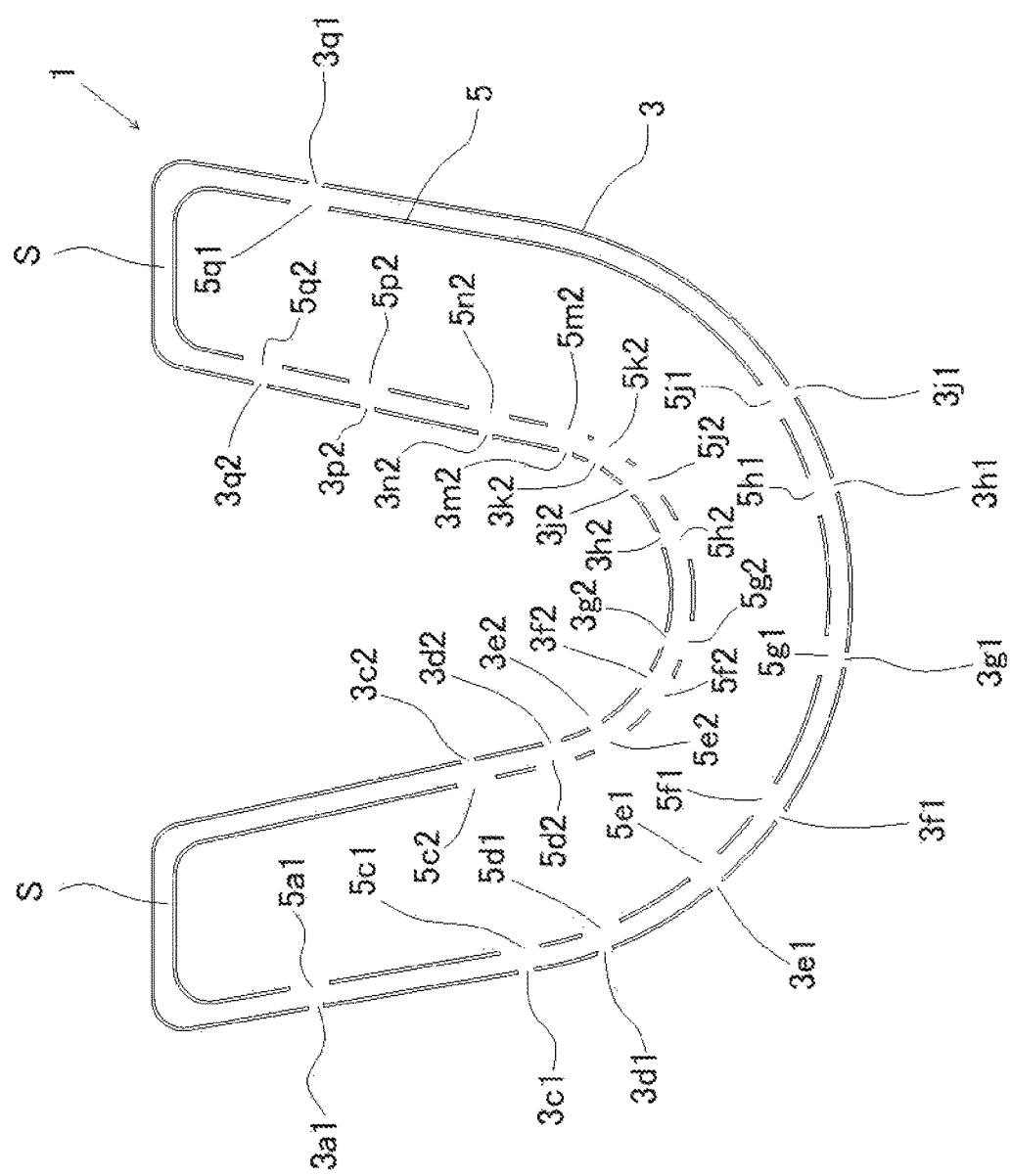
[FIG.05]

[FIG.06]
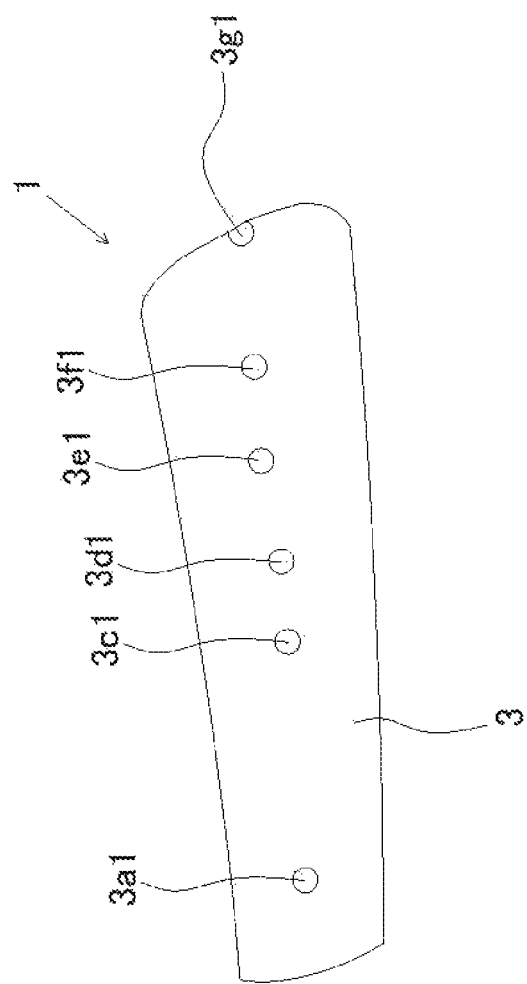

[FIG.07]
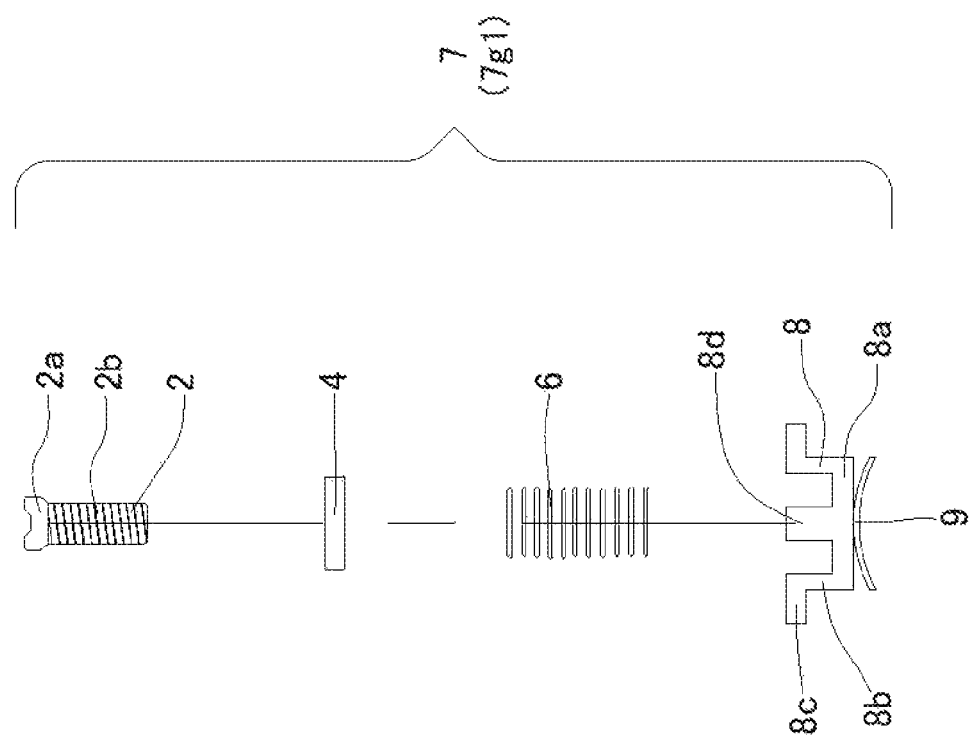

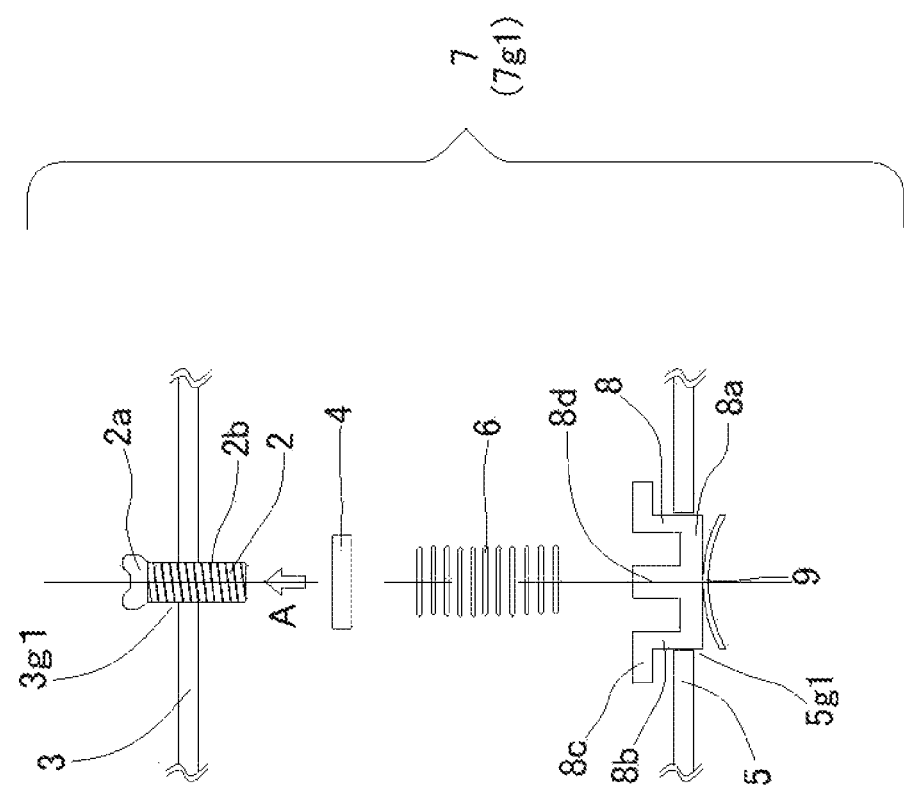

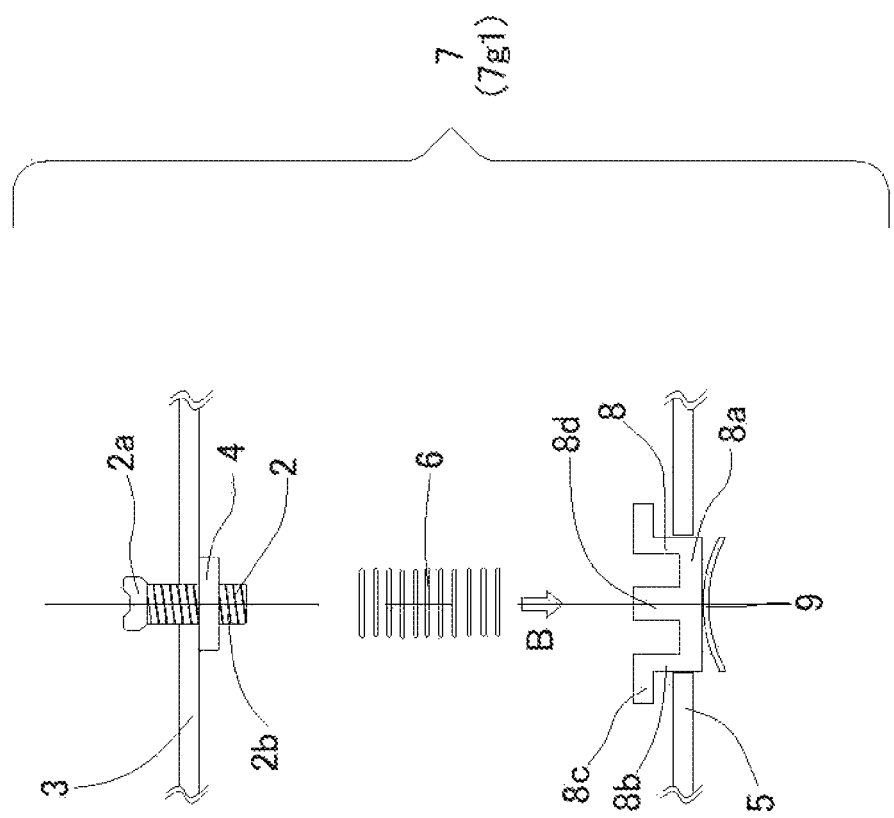

[FIG.10]
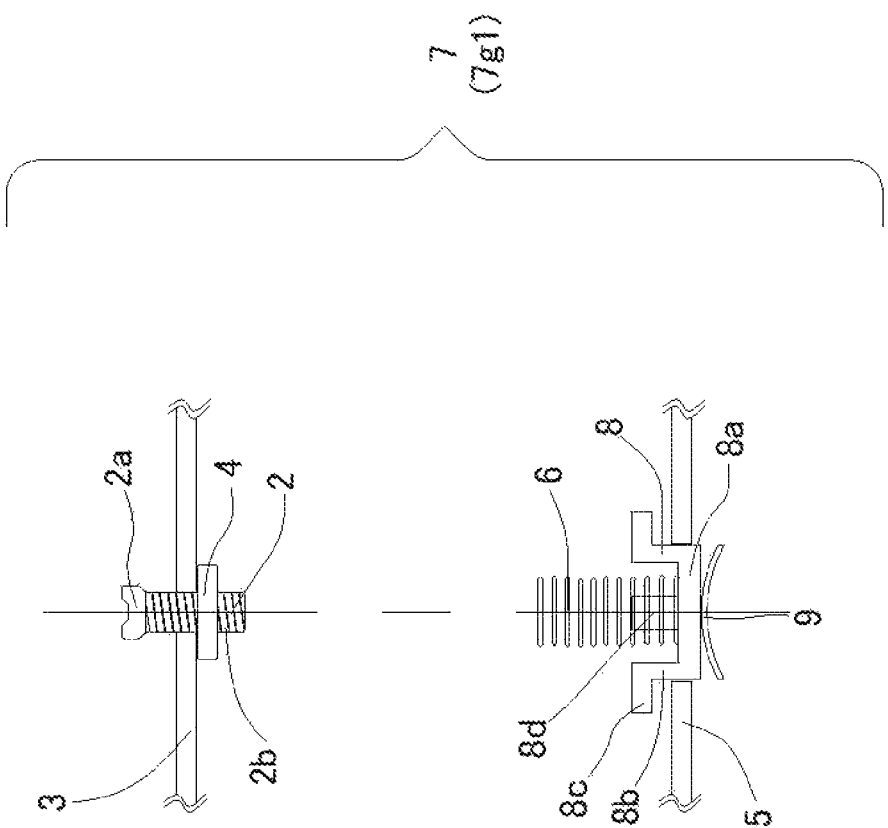

[FIG. 11]
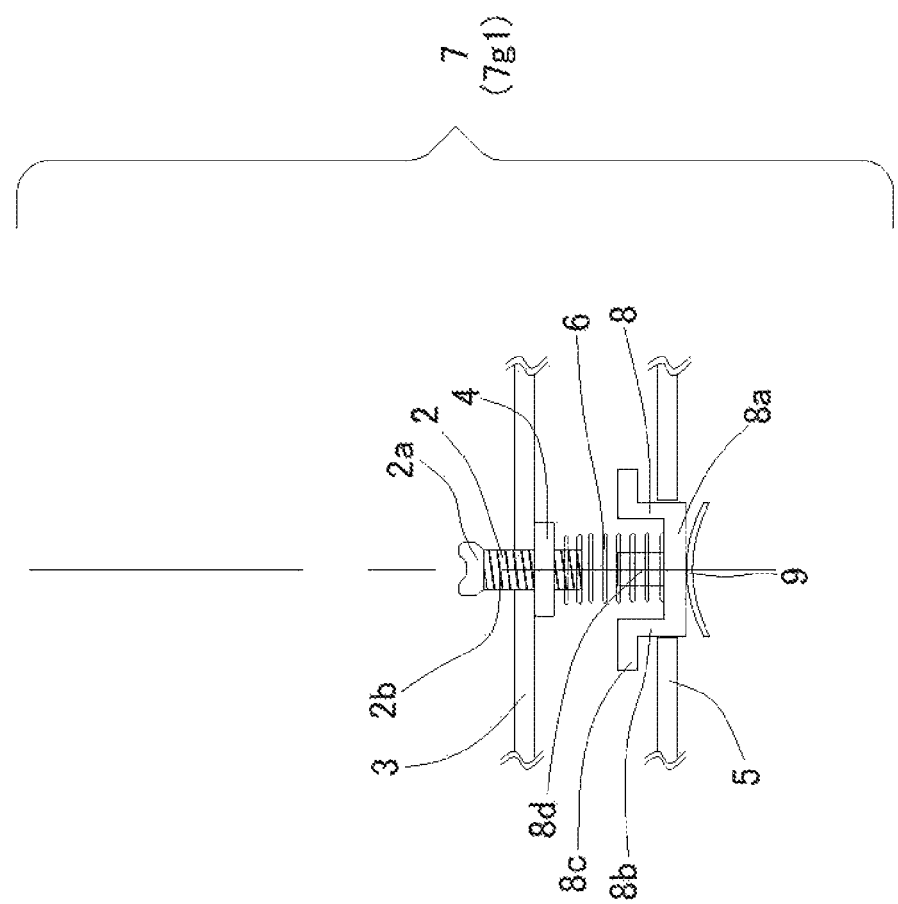

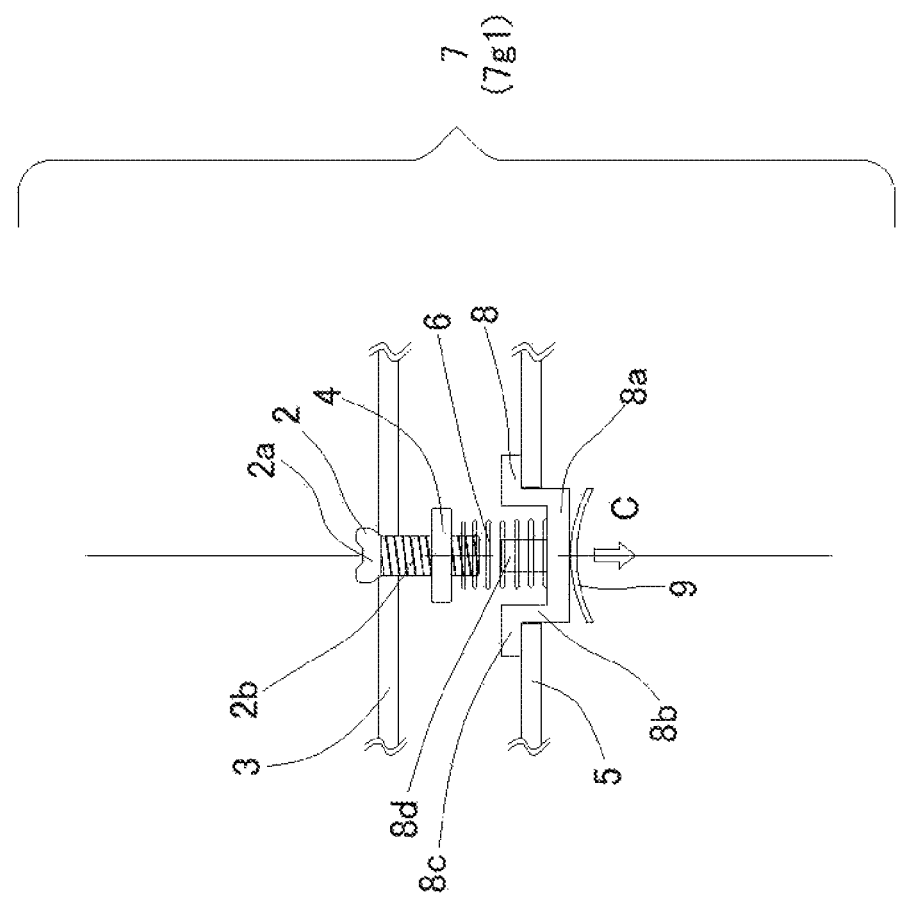

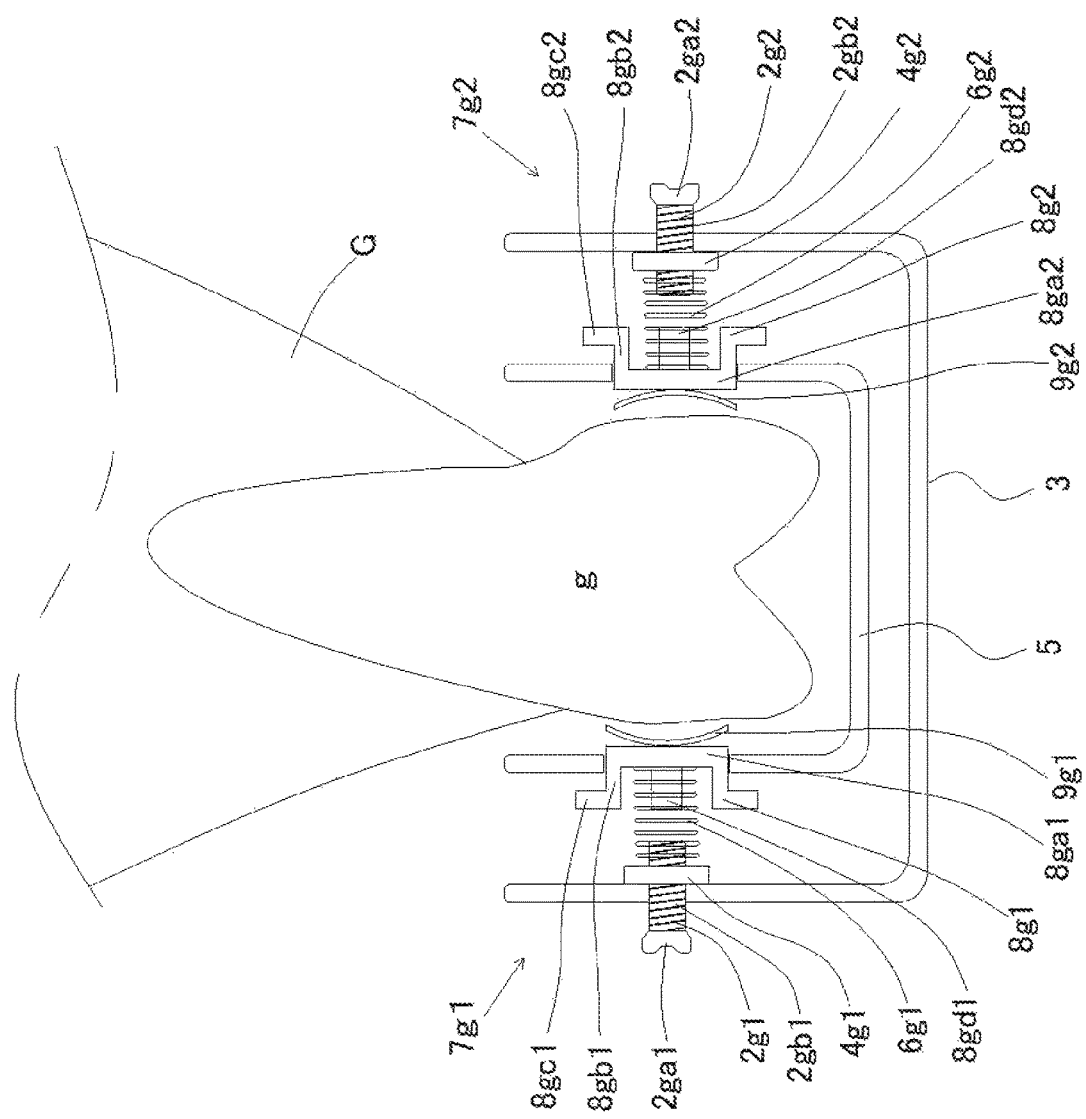
[FIG.13]

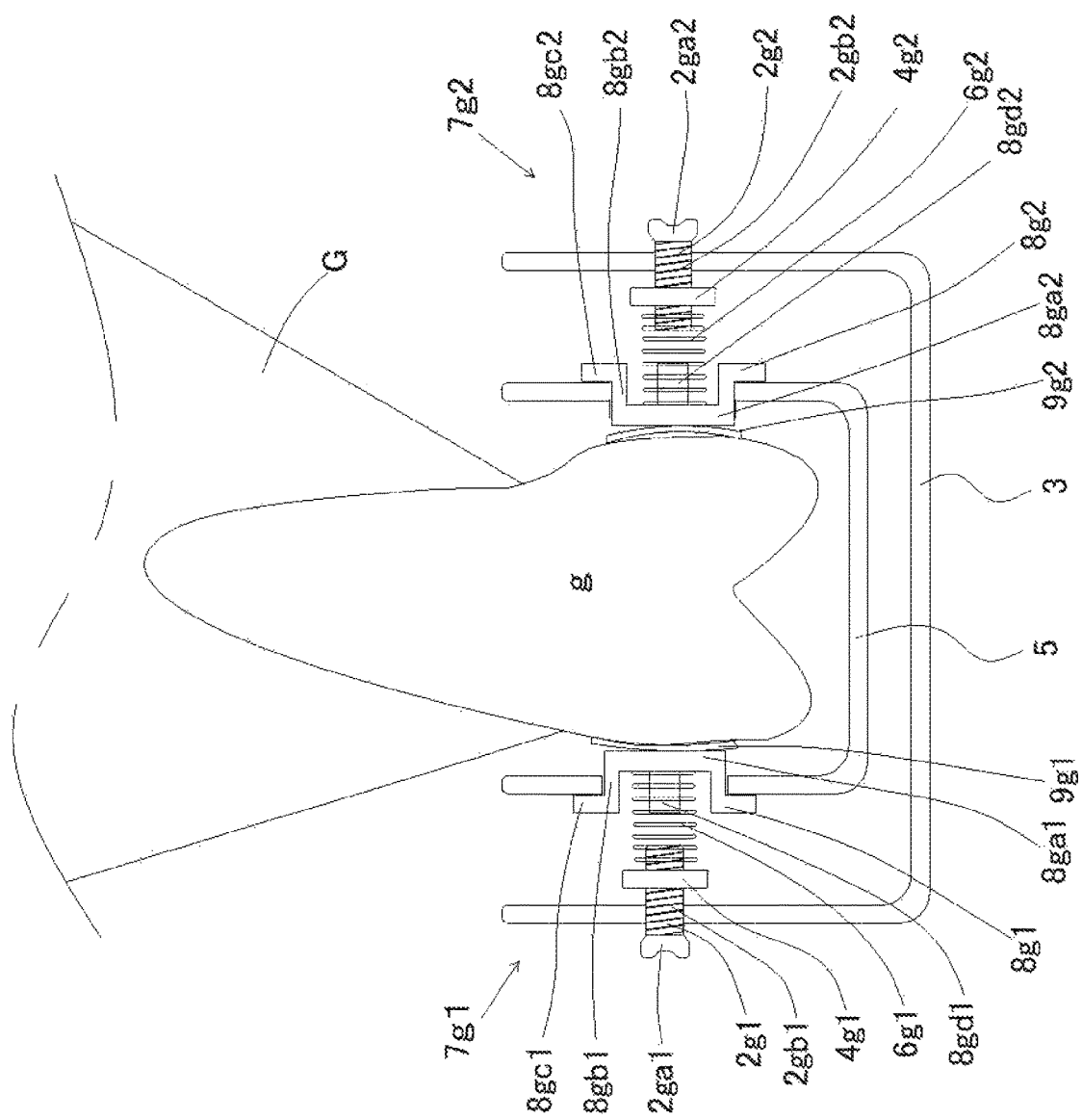
[FIG.14]

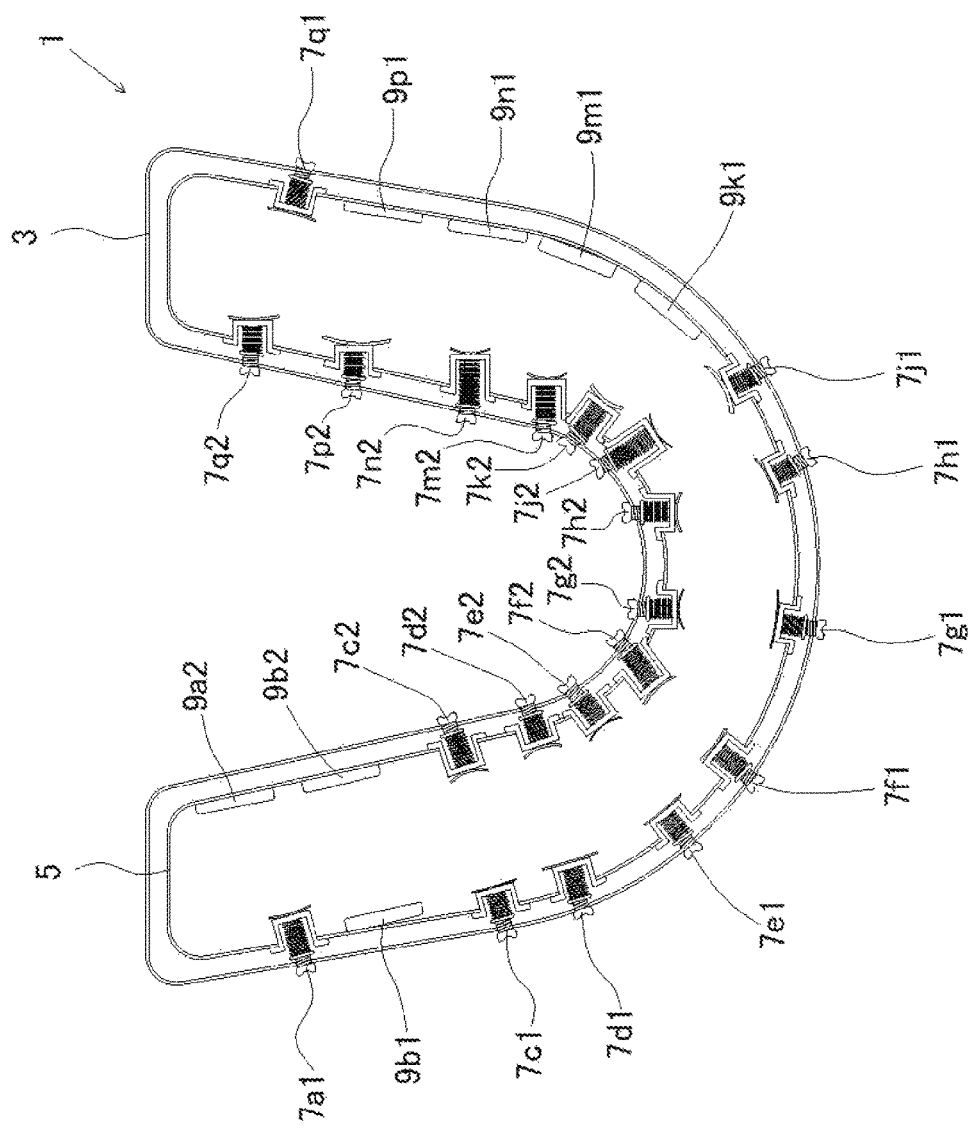

[FIG.16]
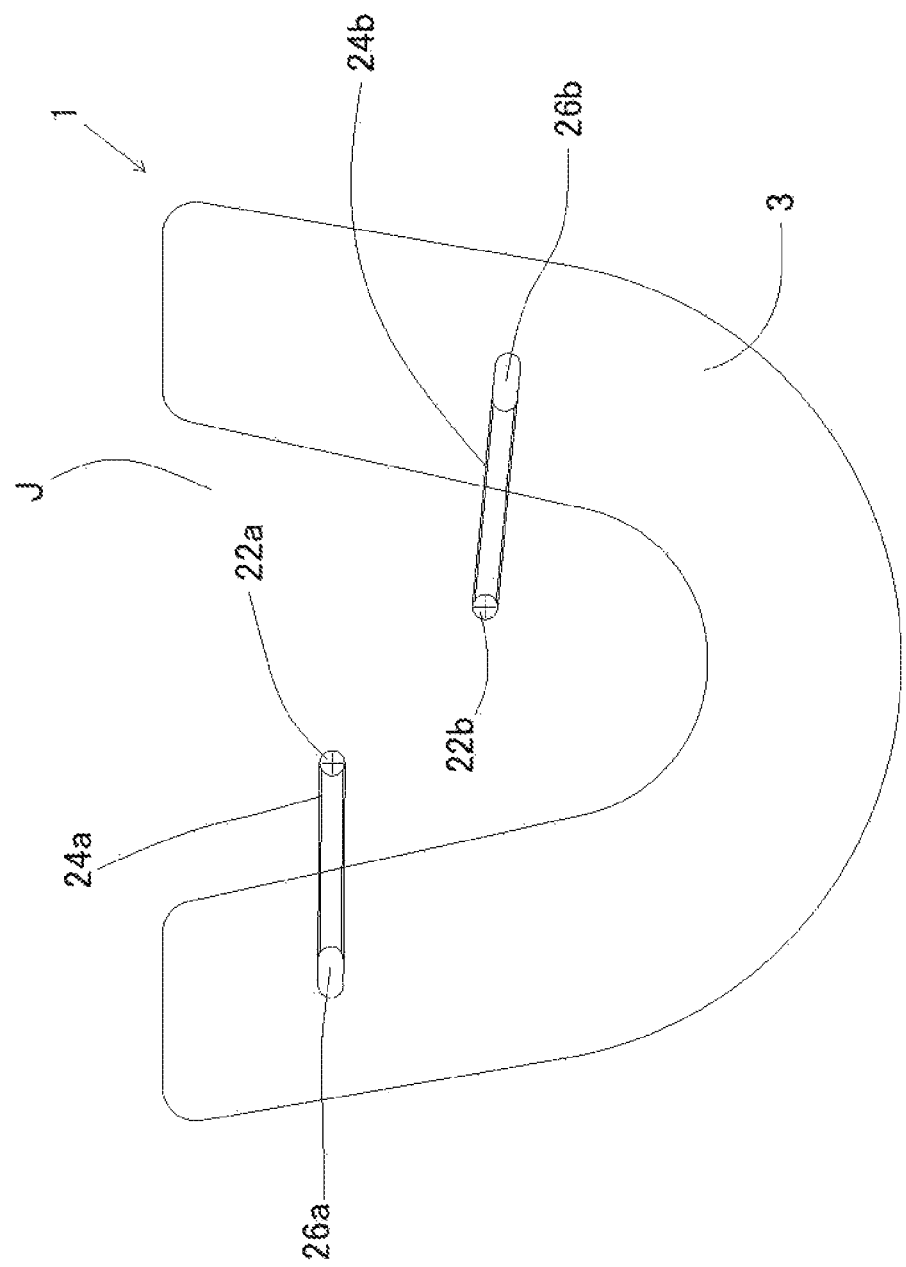

[FIG.17]
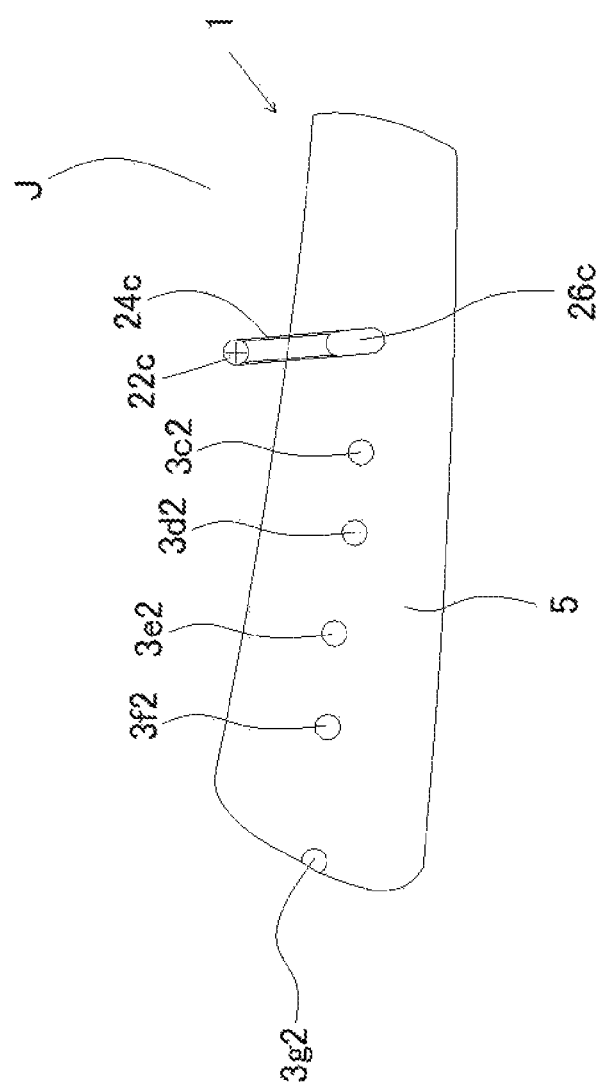

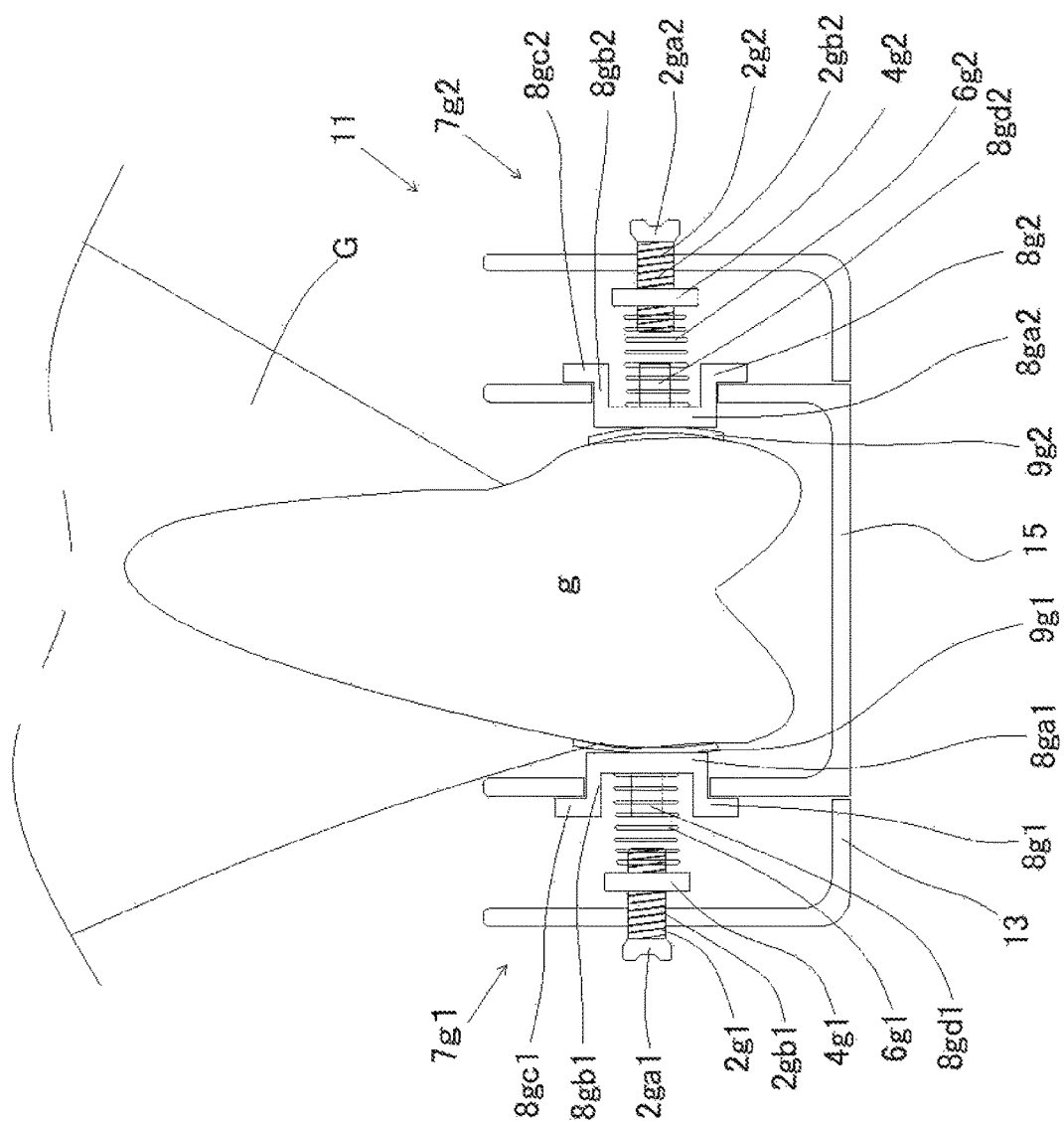
[FIG.18]

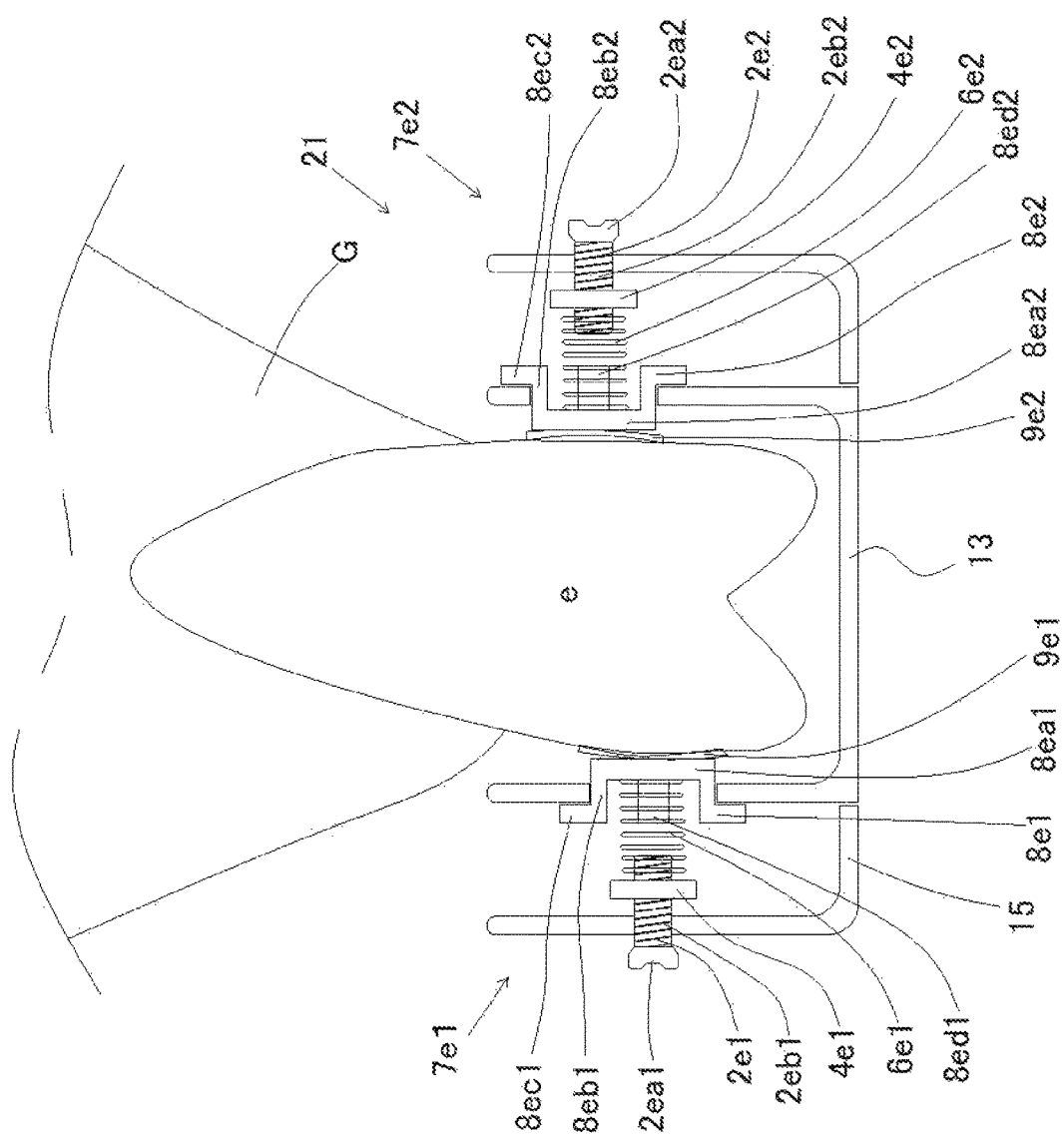
[FIG.19]

[FIG.20]
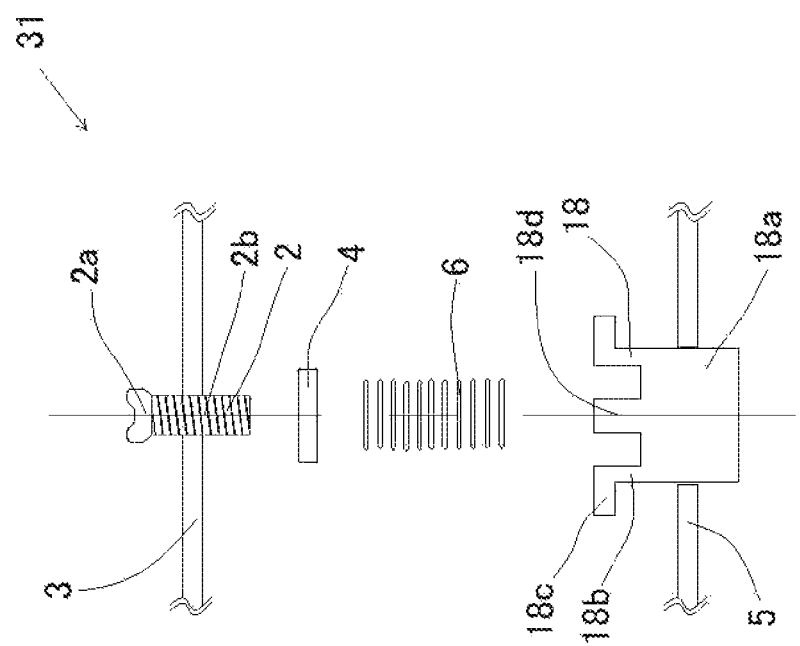

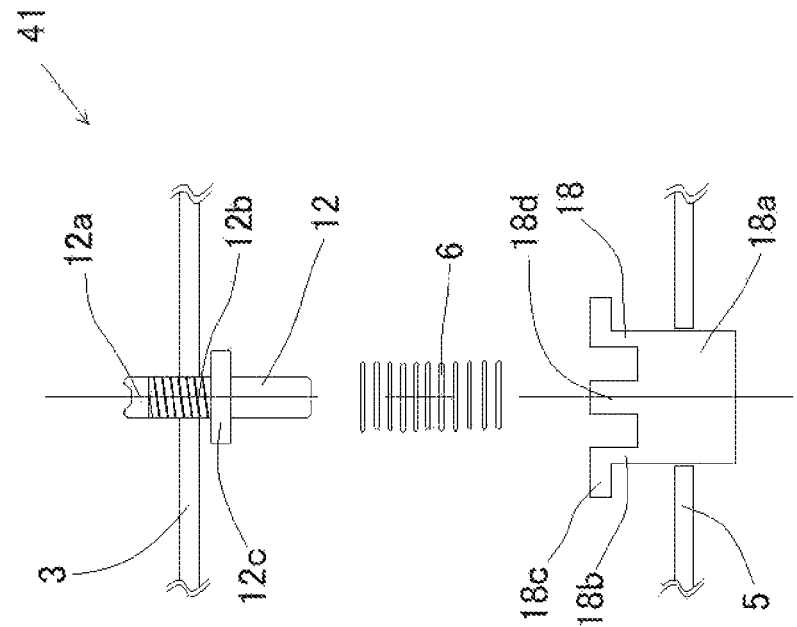

ORTHODONTIC DEVICE

This application is a continuation application of PCT/JP2019/005826 filed Feb. 18, 2019, the entire disclosure of which is incorporated herein by reference.

BACKGROUND

The present disclosure relates to an orthodontic device mounted in a patient's oral cavity and straightening patient's crooked teeth.

Various orthodontic devices to straighten patient's crooked teeth have been conventionally designed. For example, Japanese Patent Application Publication No. 2015-177969 A discloses an orthodontic device comprising a first portion covering from a crown portion of a tooth to a periphery of a tooth neck, a second portion constituting a gripping member, and a force applying member that is disposed so as to connect the first portion to the second portion and move the tooth in a desired direction (see FIG. 1 etc.).

Further, Japanese Patent Application Publication No. 2015-150179 A discloses an orthodontic device in which a shape memory alloy is embedded in an outer peripheral wall, an inner peripheral wall and an occlusal surface of each of the upper and lower jaws of a U-shaped mouthpiece made of an elastic material or a flexible material (see FIG. 1 etc.).

SUMMARY

However, the conventional orthodontic device corrects the entire teeth of the patient in a certain direction, and there is a problem that it is difficult to individually correct the teeth in different directions.

In addition, it is necessary to adjust not only the direction in which the force is applied to the tooth but also the force applied to each tooth in order to properly correct each tooth, which causes a problem that the orthodontic device itself becomes complicated.

Further, an orthodontic device having a complicated mechanism has a complicated usage method, which may be difficult to handle for a patient.

However, since an alignment of teeth is a very important factor in appearance, there is an increasing demand year after year to correct a dentition with high accuracy.

The present disclosure has been made in response to the above-described problems of the conventional art, and an exemplary aspect of the disclosure provides an orthodontic device that can be easily manufactured in accordance with different dentition conditions of each patient.

A first aspect of the present disclosure includes an inner housing that covers teeth, an outer housing that covers the inner housing, a bracket that is capable of pressing against the teeth and that penetrates the inner housing, and a pressing force adjuster that engages with the outer housing and the bracket and that is capable of adjusting a pressing force of the bracket on the teeth.

A second aspect of the present disclosure is the orthodontic device according to the first aspect, wherein the pressing force adjuster includes the outer housing, a screw screwed to the outer housing, and a compression spring fitted to the screw.

A third aspect of the present disclosure is the orthodontic device according to the second aspect, wherein the screw includes a bulge having an outer diameter larger than an inner diameter of a screw hole of the outer housing and an outer diameter of the compression spring in a middle of the screw.

A fourth aspect of the present disclosure is the orthodontic device according to the third aspect, wherein the bulge is attachable to and detachable from the screw.

A fifth aspect of the present disclosure is the orthodontic device according to any one of the first to fourth aspects, wherein the bracket includes a plurality of brackets that are provided for each tooth, and at least one bracket of the plurality of brackets has a height different from that of other brackets of the plurality of brackets with respect to the tooth.

A sixth aspect of the present disclosure is the orthodontic device according to any one of the first to fifth aspects, wherein a region of the bracket that is in contact with a tooth has a higher surface roughness than other regions of the bracket.

A seventh aspect of the present disclosure is the orthodontic device according to any one of the first to sixth aspects, wherein zirconia is formed in a region of the bracket that is in contact with a tooth.

An eighth aspect of the present disclosure is the orthodontic device according to any one of the first to seventh aspects, wherein the bracket includes a restrictor that restricts a movement of the bracket.

A ninth aspect of the present disclosure is the orthodontic device according to any one of the first to eighth aspects, wherein the pressing force adjuster is capable of adjusting the pressing force of the bracket on the teeth by adjusting a length of a bottom of the bracket.

According to the orthodontic device of the first aspect of the present disclosure, since an orthodontic device includes an inner housing that covers teeth, an outer housing that covers the inner housing, a bracket that is capable of pressing against the teeth and that penetrates the inner housing, and a pressing force adjuster that engages with the outer housing and the bracket and that is capable of adjusting a pressing force of the bracket on the teeth, a dentist or a dental technician is capable of easily manufacturing the orthodontic device according to the different dentition conditions of each patient, patients are capable of easily adjusting their own teeth by the orthodontic device.

Further, according to a second aspect of the present disclosure, in the orthodontic device according to the first aspect, since the pressing force adjuster includes the outer housing, a screw screwed to the outer housing, and a compression spring fitted to the screw, in addition to the effects of the orthodontic device of the first aspect of the present disclosure, a dentist or a dental technician is capable of easily manufacturing the orthodontic device adjusting the pressing force of the bracket on each tooth of the patient, patients are capable of more easily adjusting their own teeth by the orthodontic device.

Further, according to a third aspect of the present disclosure, in the orthodontic device according to the second aspect, since the screw includes a bulge having an outer diameter larger than an inner diameter of a screw hole of the outer housing and an outer diameter of the compression spring in a middle of the screw, in addition to the effects of the orthodontic device of the second aspect of the present disclosure, the pressing force of the bracket against the tooth may be effectively applied.

Further, according to a fourth aspect of the present disclosure, in the orthodontic device according to the third aspect, since the bulge is attachable to and detachable from the screw, in addition to the effects of the orthodontic device of the third aspect of the present disclosure, the pressing force adjuster may be easily manufactured.

Further, according to a fifth aspect of the present disclosure, in the orthodontic device according to any one of the first to fourth aspects, since the bracket includes a plurality of brackets that are provided for each tooth, and at least one bracket of the plurality of brackets has a height different from that of other brackets of the plurality of brackets with respect to the tooth, in addition to the effects of the orthodontic device of any one of the first to fourth aspects of the present disclosure, a dentist or a dental technician is capable of easily manufacturing the orthodontic device improving orthodontic effect of the patient's teeth by changing a pressing position of the bracket for each tooth of the patient, and patients are capable of more easily adjusting their own teeth by the orthodontic device.

Further, according to a sixth aspect of the present disclosure, in the orthodontic device according to any one of the first to fifth aspects, since a region of the bracket that is in contact with a tooth has a higher surface roughness than other regions of the bracket, in addition to the effects of the orthodontic device of any one of the first to fifth aspects of the present disclosure, it is possible to reliably prevent the orthodontic device from slipping on the patient's teeth, and the patient may use the orthodontic device with confidence.

Further, according to a seventh aspect of the present disclosure, in the orthodontic device according to any one of the first to sixth aspects, since zirconia is formed in a region of the bracket that is in contact with a tooth, in addition to the effects of the orthodontic device of any one of the first to sixth aspects of the present disclosure, it is possible to reliably prevent the orthodontic appliance from slipping on the patient's teeth, and the patient may use the orthodontic device with confidence.

Further, according to the eighth aspect of the present disclosure, in the orthodontic device according to any one of the first to seventh aspects, since the bracket includes a restrictor that restricts a movement of the bracket, in addition to the effects of the orthodontic device of any one of the first to seventh aspects of the present disclosure, it is possible to prevent the bracket from coming off the inner housing.

Furthermore, according to a ninth aspect of the present disclosure, in the orthodontic device according to any one of the first to eighth aspects, since the pressing force adjuster is capable of adjusting the pressing force of the bracket on the teeth by adjusting a length of a bottom of the bracket, in addition to the effects of the orthodontic device of any one of the first to eighth aspects of the present disclosure, the pressing force adjuster may be manufactured more easily.

BRIEF DESCRIPTION OF THE DRAWINGS

FIG. 1 is an overall plan sectional view showing a state in which an orthodontic device of a first embodiment of the present disclosure is attached to teeth.

FIG. 2 is a perspective view showing a state in which an inner housing is inserted into an outer housing in the orthodontic device of the first embodiment.

FIG. 3 is a bottom view showing a state in which the inner housing is inserted into the outer housing in the orthodontic device of the first embodiment.

FIG. 4 is a plan view showing a state in which the inner housing is inserted into the outer housing in the orthodontic device of the first embodiment.

FIG. 5 is a transverse cross-sectional view showing a state in which the inner housing is inserted into the outer housing in the orthodontic device of the first embodiment.

FIG. 6 is a left side view showing a state in which the inner housing is inserted into the outer housing in the orthodontic device of the first embodiment.

FIG. 7 is components diagram of a pressing force adjustment mechanism in the orthodontic device of the first embodiment.

FIG. 8 is a first explanatory diagram for explaining a method of manufacturing the pressing force adjustment mechanism in the orthodontic device of the first embodiment.

FIG. 9 is a second explanatory diagram for explaining the method of manufacturing the pressing force adjustment mechanism in the orthodontic device of the first embodiment.

FIG. 10 is a third explanatory diagram for explaining the method of manufacturing the pressing force adjustment mechanism in the orthodontic device of the first embodiment.

FIG. 11 is a fourth explanatory diagram for explaining the method of manufacturing the pressing force adjustment mechanism in the orthodontic device of the first embodiment.

FIG. 12 is a final explanatory diagram for explaining the method of manufacturing the pressing force adjusting mechanism in the orthodontic device of the first embodiment.

FIG. 13 is a first explanatory diagram for explaining an adjusting method of the orthodontic device of the first embodiment.

FIG. 14 is a second explanatory diagram for explaining the adjusting method of the orthodontic device of the first embodiment.

FIG. 15 is a plan cross-sectional view of the orthodontic device of the first embodiment.

FIG. 16 is a first explanatory diagram showing a mounting example of the orthodontic device of the first embodiment.

FIG. 17 is a second explanatory diagram showing a mounting example of the orthodontic device of the first embodiment.

FIG. 18 is a vertical sectional view of an orthodontic device of a second embodiment.

FIG. 19 is a vertical sectional view of an orthodontic device of a third embodiment.

FIG. 20 is a components diagram of a pressing force adjusting mechanism in an orthodontic device of a fourth embodiment.

FIG. 21 is a components diagram of a pressing force adjusting mechanism in an orthodontic device of a fifth embodiment.

DETAILED DESCRIPTION OF EMBODIMENTS

Hereinafter, embodiments of the present disclosure will be described with reference to the drawings.

First Embodiment

First of all, a first embodiment of the present disclosure will be described.

FIG. 1 is an overall plan sectional view showing a state in which an orthodontic device of a first embodiment of the present disclosure is attached to teeth.

FIG. 2 is a perspective view showing a state in which an inner housing is inserted into an outer housing in the orthodontic device of the first embodiment, FIG. 3 is a bottom view thereof, FIG. 4 is a plan view thereof, FIG. 5 is a transverse cross-sectional view thereof, and FIG. 6 is a left side view thereof.

Further, FIG. 7 is components diagram of a pressing force adjustment mechanism in the orthodontic device of the first embodiment, FIG. 8 is a first explanatory diagram for explaining a method of manufacturing the pressing force adjustment mechanism in the orthodontic device of the first embodiment, FIG. 9 is a second explanatory diagram thereof, FIG. 10 is a third explanatory diagram thereof, FIG. 11 is a fourth explanatory diagram thereof, and FIG. 12 is a final explanatory diagram thereof.

Further, FIG. 13 is a first explanatory diagram for explaining an adjusting method of the orthodontic device of the first embodiment, and FIG. 14 is a second explanatory diagram thereof.

Furthermore, FIG. 15 is a plan cross-sectional view of the orthodontic device of the first embodiment, FIG. 16 is a first explanatory diagram showing a mounting example of the orthodontic device of the first embodiment, and FIG. 17 is a second explanatory diagram thereof.

In FIG. 1, an orthodontic device 1 of the present embodiment is to be attached to an upper jaw of a patient, and includes an inner housing 5 directly covering patient's teeth, an outer housing 3 covering an outer periphery of the inner housing 5, twenty-one bracket assemblies 7 ($7a1$, $7c1$, $7d1$, $7e1$, $7f1$, $7g1$, $7h1$, $7j1$, $7q1$, $7c2$, $7d2$, $7e2$, $7f2$, $7g2$, $7h2$, $7j2$, $7k2$, $7m2$, $7n2$, $7p2$ and $7q2$) which penetrate the inner housing 5 and are arranged to press against patient's teeth, and seven cushioning members 9 ($9b1$, $9k1$, $9m1$, $9n1$, $9p1$, $9a2$ and $9b2$) supporting the patient's teeth on which the bracket assembly 7 is not arranged.

In addition, although the number of patient's teeth is 14 (a, b, c, d, e, f, g, h, j, k, m, n, p and q) without wisdom teeth in the orthodontic device 1 of the present embodiment, the present disclosure may be applied even when there are wisdom teeth. The orthodontic device in that case may be manufactured by extending the orthodontice device for one tooth on each side.

Further, it is natural that the present disclosure is applicable even in cases where some teeth are missing, and the orthodontic device in that case does not need to be changed in particular, but brackets 8 to be described later may be added in the region of the missing teeth.

As shown in FIG. 2, FIG. 4, FIG. 5, FIG. 13, and FIG. 14, the inner housing 5 has a substantially rectangular shape in cross section, a substantially U shape in plan view, both ends closed, and a groove-like shape with an upper side open.

As shown in FIGS. 2 and 5, a plurality of round holes into which brackets 8 to be described later are inserted are formed on a side wall of the inner housing 5. Specifically, nine round holes ($5a1$, $5c1$, $5d1$, $5e1$, $5f1$, $5g1$, $5h1$, $5j1$ and $5q1$) into which the brackets 8 to be described later are inserted are formed on an outer side wall of the inner housing 5, nine round holes ($5c2$, $5d2$, $5e2$, $5f2$, $5g2$, $5h2$, $5j2$, $5k2$, $5m2$, $5n2$, $5p2$ and $5q2$) into which the brackets 8 to be described later are inserted are formed on an inner side wall of the inner housing 5.

Further, as shown in FIG. 2, FIG. 3, FIG. 4, FIG. 5, FIG. 6, FIG. 13, and FIG. 14, the outer housing 3 is larger than the inner housing 5 in a substantially rectangular shape in cross section and a substantially U shape in plan view, and has both ends closed and a groove-like shape with an upper side open.

As shown in FIGS. 2 and 5, a plurality of round holes each having a thread groove so that a screw 2 to be described later may be screwed are formed on a side wall of the outer housing 3.

Specifically, nine round screw holes ($3a1$, $3c1$, $3d1$, $3e1$, $3f1$, $3g1$, $3h1$, $3j1$ and $3q1$) each having a thread groove so that a screw 2 to be described later may be screwed are formed on an outer side wall of the outer housing 3, and twelve round screw holes ($3c2$, $3d2$, $3e2$, $3f2$, $3g2$, $3h2$, $3j2$, $3k2$, $3m2$, $3n2$, $3p2$ and $3q2$) each having a thread groove so that a screw 2 to be described later may be screwed are formed on an inner side wall of the outer housing 3.

Further, the height of the side wall of the outer housing 3 may be formed with the same height from the patient's front teeth to the back teeth, but if the height of the side wall corresponding to the front teeth is tall and gradually decreases toward the back teeth as shown in FIG. 6, discomfort of the patient may be reduced.

Further, a space S is formed between the outer housing 3 and the inner housing 5 to accommodate brackets 8 and screws 2 etc. to be described later.

In addition, the material of the inner housing 5 and the outer housing 3 is not particularly limited as long as it is metal material or synthetic polymer made of biocompatible material. For example, metal material such as titanium alloy, cobalt alloy and stainless steel or synthetic polymer material such as nylon, polypropylene, polyethylene terephthalate and Teflon (registered trademark) may be used. Titanium alloy is used in this present embodiment.

As shown in FIG. 7, the bracket assembly 7 includes a bracket 8, a spring 6 inserted to a protruding portion $8d$ of the bracket 8, a screw 2 inserted into the spring 6, a stopper 4 attached to the screw 2, and a cushioning member 9 arranged on a bottom of the bracket 8.

In addition, FIG. 7 is components diagram of a pressing force adjustment mechanism in the orthodontic device of the first embodiment.

The bracket 8 is a circular component in plan view, and includes a disk-shaped bottom portion $8a$, a cylindrical portion $8b$, a disk-shaped flange portion $8c$ having an outer diameter larger than that of the cylindrical portion $8b$, and a protruding portion $8d$ extending coaxially with the cylindrical portion $8b$ from a center of the bottom portion $8a$.

The material of the bracket 8 is not particularly limited as long as it is metal material or synthetic polymer made of biocompatible material, for example, metal material such as titanium alloy, cobalt alloy and stainless steel or synthetic polymer material such as nylon, polypropylene, polyethylene terephthalate or Teflon (registered trademark) may be used. Titanium alloy is used in this present embodiment.

The spring 6 is an ordinary cylindrical compression spring, is disposed between the bottom portion $8a$ of the bracket 8 and the stopper 4 in a compressed state.

The material of the spring 6 is not particularly limited as long as it is metal material or synthetic polymer made of biocompatible material having spring property, for example, metal material such as titanium alloy, cobalt alloy and stainless steel or synthetic polymer material such as nylon, polypropylene, polyethylene terephthalate or Teflon (registered trademark) may be used. Titanium alloy is used in this present embodiment.

The screw 2 includes a screw head portion $2a$ and a screw shaft portion $2b$, presses or releases the spring 6 in cooperation with the stopper 4.

The material of the screw 2 is not particularly limited as long as it is metal material or synthetic polymer made of biocompatible material having spring property, for example, metal material such as titanium alloy, cobalt alloy and stainless steel or synthetic polymer material such as nylon, polypropylene, polyethylene terephthalate or Teflon (registered trademark) may be used. Titanium alloy is used in this present embodiment.

The stopper 4 is a ring-shaped component having a round cross section, presses or releases the spring 6 in cooperation with the screw 2 and prevents the screw 2 from coming off the outer housing 3.

The material of the stopper 4 is not particularly limited as long as it is rubber made of biocompatible material having elasticity, silicone rubber is used in this present embodiment.

Further, the cushioning member 9 is a component that is disposed on the bottom of the bracket 8 and is in direct contact with the patient's tooth, and surface roughness of the cushioning member 9 is set to be high from the viewpoint of preventing positional displacement against a tooth.

The material of the cushioning member 9 is not particularly limited as long as it is metal material or synthetic polymer made of biocompatible material, for example, metal material such as zirconia, titanium oxide, lithium disilicate, titanium alloy, cobalt alloy, stainless steel or synthetic polymer material such as nylon, polypropylene, polyethylene terephthalate or Teflon (registered trademark) may be used. Zirconia having a high surface roughness is used in this present embodiment.

Hereinafter, a method of manufacturing the bracket assembly 7 will be described with reference to the drawings.

FIG. 8 is a first explanatory diagram for explaining a method of manufacturing the pressing force adjustment mechanism in the orthodontic device of the first embodiment, FIG. 9 is a second explanatory diagram thereof, FIG. 10 is a third explanatory diagram thereof, FIG. 11 is a fourth explanatory diagram thereof, FIG. 12 is a final explanatory diagram f thereof.

For ease of explanation, the distance between the outer housing 3 and the inner housing 5 will be described to be wider than the actual distance in FIGS. 8 to 10.

In description of the method of manufacturing the bracket assembly 7, a bracket assembly 7g1 (see FIG. 1) will be described as an example.

In the method of manufacturing the bracket assembly 7, first of all, the bracket 8 is inserted into a hole 5g1 of the inner housing 5, and then the cushioning member 9 is adhered to a bottom surface of the bottom portion 8a of the bracket 8 as shown in FIG. 8.

On the other hand, after the screw 2 is screwed into a hole 3g1 of the outer housing 3, the stopper 4 is moved in the direction of an arrow A which is the direction to the screw 2 so that the stopper 4 and the screw shaft portion 2b of the screw 2 are fitted together.

The screw 2 at that time is preferably disposed so that the screw shaft portion 2b is exposed to the upper side to some extent from the surface of the outer housing 3 in consideration of the amount of pushing into the bracket 8 described later.

Then, the spring 6 is moved in the direction of an arrow B which is the direction to the bracket 8 so that the spring 6 and the protruding portion 8d of the bracket 8 are fitted together as shown in FIG. 9.

Through the above steps, the bracket assembly 7 is disposed between the outer housing 3 and the inner housing 5 as shown in FIG. 10, and actually, the bracket assembly 7 is disposed between the outer housing 3 and the inner housing 5 as shown in FIG. 11.

Finally, a urging force of the spring 6 is increased by moving the stopper 4 to the bracket 8 side to rotate the screw 2, and the bracket 8 moves in the direction of the arrow C which is the direction to a tooth by the increased urging force of the spring 6. Then, the setting of the bracket assembly 7 is completed as shown in FIG. 12.

In addition, the bracket 8 corresponds to the pressing portion of the present disclosure, and the outer housing 3, the screw 2, the stopper 4, and the spring 6 function as the pressing force adjuster of the present disclosure.

The stopper 4 corresponds to the bulge portion of the present disclosure, and the flange portion 8c of the bracket 8 corresponds to the restricting portion/restrictor of the present disclosure.

In the description of the present manufacturing method, although it is described that the screw head portion 2a of the screw 2 is in contact with the surface of the outer housing 3 as shown in FIG. 12, the rotation amount of the screw 2 depends on patient's dentition.

That is, when moving distance of the bracket 8 with respect to patient's teeth is short, the screw head portion 2a of the screw 2 is exposed on the surface of the outer housing 3, and when moving distance of the bracket 8 with respect to patient's teeth is long, amount of exposure of the screw head portion 2a from the surface of the outer housing 3 decreases as moving distance increases.

Although the cushioning member 9 is adhered to the bottom surface of the bracket 8 in the description of the present manufacturing method, when the orthodontic device 1 is attached to the patient's teeth, it may be disposed so as to be sandwiched between the bracket 8 and the patient's teeth without adhering the cushioning member 9 to the bottom surface of the bracket 8.

Next, an adjusting method for setting the orthodontic device 1 of the present embodiment on the patient's teeth will be described with reference to the drawings.

FIG. 13 is a first explanatory diagram for explaining an adjusting method of the orthodontic device of the first embodiment, and FIG. 14 is a second explanatory diagram thereof.

In the description of the adjustment method of the orthodontic device 1, the bracket assembly 7g1 and the bracket assembly 7g2 (see FIG. 1) will be described as an example.

In the description of the adjusting method, the bracket assembly 7g1 includes a bracket 8g1, a spring 6g1, a screw 2g1, a stopper 4g1, and a cushioning member 9g1.

The bracket 8g1 includes a bottom portion 8ga1, a cylindrical portion 8gb1, a flange portion 8gc1, and a protruding portion 8gd1, and the screw 2g1 includes a screw head portion 2ga1 and a screw shaft portion 2gb1.

On the other hand, the bracket assembly 7g2 in the description of the present adjustment method includes a bracket 8g2, a spring 6g2, a screw 2g2, a stopper 4g2, and a cushioning member 9g2.

The bracket 8g2 includes a bottom portion 8ga2, a cylindrical portion 8gb2, a flange portion 8gc2, and a protruding portion 8gd2, and the screw 2g2 includes a screw head portion 2ga2 and a screw shaft portion 2gb2.

In order to set the orthodontic device 1 of the present embodiment on the patient's teeth, first of all, by setting to the state increasing the distance between the bracket assembly 7g1 and the bracket assembly 7g2, air gap is formed between each bracket assembly and the patient's tooth as shown in FIG. 13. Then the orthodontic device 1 is moved toward a patient's gum G and it is set on the patient's teeth g.

Then urging force of the spring 6g1 is increased by moving the stopper 4g1 to the bracket 8g1 side to rotate the screw 2g1 set in the bracket assembly 7g1 as shown in FIG.

14, and the bracket 8g1 is placed in contact with the patient's teeth via the cushioning member 9g1 by urging force of the spring 6g1.

On the other hand, also regarding the bracket assembly 7g2, urging force of the spring 6g2 is increased by moving the stopper 4g2 to the bracket 8g2 side to rotate the screw 2g2 set in the bracket assembly 7g2 as shown in FIG. 14, and the bracket 8g2 is placed in contact with the patient's teeth via the cushioning member 9g2 by urging force of the spring 6g2. In addition, proper urging force against the patient's tooth is approximately 25 gf to 100 gf.

In this way, the orthodontic device 1 is completed as shown in FIG. 15 by adjusting the bracket assembly for each of patient's teeth.

FIG. 15 is a plan cross-sectional view of the orthodontic device of the first embodiment.

In the present embodiment, the cushioning member 9 is disposed at a position where the bracket assembly 7 is not disposed in the patient's teeth as shown in FIG. 15. The cushioning member 9 is used not only for teeth that do not need to be straightened but also for teeth to be straightened only by the inner housing 5.

In the present embodiment, seven cushioning members 9 are disposed directly on the inner housings 5. Specifically, the cushioning members 9b1, 9k1, 9m1, 9n1, 9p1, 9a2 and 9b2 are disposed on the inner housings 5.

Finally, a mounting method for mounting the orthodontic device 1 described above on the patient's teeth will be described with reference to the drawings.

FIG. 16 is a first explanatory diagram showing a mounting example of the orthodontic device of the first embodiment, and FIG. 17 is a second explanatory diagram thereof.

As shown in FIG. 16, the orthodontic device 1 is mounted on the patient's teeth to stretch a rubber band 24a made of biocompatible material between a screw 22a inserted into a patient's upper jaw J and a hook 26a formed on a bottom surface of the outer housing 3, and to stretch a rubber band 24b made of biocompatible material between a screw 22b inserted into the patient's upper jaw J and a hook 26b formed on the bottom surface of the outer housing 3.

Further, as shown in FIG. 17, the orthodontic device 1 of the present embodiment may be mounted on the patient's teeth to stretch a rubber band 24c made of biocompatible material between a screw 22c inserted into a patient's upper jaw J and a hook 26c formed on an inner side surface of the inner housing 5.

According to the orthodontic device 1 of the present embodiment, since the orthodontic device 1 comprises the inner housing 5 covering teeth, the outer housing 3 covering the inner housing 5, the bracket 8 capable of pressing against the teeth and penetrating the inner housing 5, and a pressing force adjusting mechanism capable of adjusting a pressing force of the bracket 8 on the teeth, a dentist or a dental technician is capable of easily manufacturing the orthodontic device according to the different dentition conditions of each patient, patients are capable of easily adjusting their own teeth by the orthodontic device.

Further, according to the orthodontic device 1 of the present embodiment, since the pressing force adjusting mechanism includes the outer housing 3, the screw 2 screwed to the outer housing 3, and the spring 6 fitted to the screw 2, a dentist or a dental technician is capable of easily manufacturing the orthodontic device adjusting the pressing force of the pressing portion/bracket 8 on each tooth of the patient, patients are capable of more easily adjusting their own teeth by the orthodontic device.

Further, according to the orthodontic device 1 of the present embodiment, since the screw 2 includes the stopper 4 having an outer diameter larger than an inner diameter of the screw hole 3a1 of the outer housing 3 and an outer diameter of the compression spring 6 in the middle of the screw shaft portion 2b, the pressing force of the bracket 8 against the tooth may be effectively applied.

Further, according to the orthodontic device 1 of the present embodiment, since the stopper 4 is attachable to and detachable from the screw 2, the pressing force adjusting mechanism may be easily manufactured.

Further, according to the orthodontic device 1 of the present embodiment, since the cushioning member 9 is disposed in a region of the bracket 8 that is in contact with the tooth, the region of the bracket 8 has a higher surface roughness than other regions, it is possible to reliably prevent the orthodontic device from slipping on the patient's teeth, and the patient may use the orthodontic device with confidence.

Further, according to the orthodontic device 1 of the present embodiment, since the cushioning member 9 made of zirconia is formed in a region of the bracket 8 that is in contact with the tooth, it is possible to reliably prevent the orthodontic appliance from slipping on the patient's teeth, and the patient may use the orthodontic device with confidence.

Furthermore, according to the orthodontic device 1 of the present embodiment, since the bracket 8 includes the flange portion 8c that restricts a movement of the bracket 8, it is possible to prevent the bracket 8 from coming off the inner housing 5.

Second Embodiment

Next, a second embodiment of the present disclosure will be described. FIG. 18 is a vertical sectional view of an orthodontic device of a second embodiment.

In addition, portions common to the first embodiment will be denoted by the same reference numerals, descriptions of the portions will be omitted in the present embodiment. An overall plan sectional view of the orthodontic device 11 of the present embodiment is similar to FIG. 1, a plan view showing a state in which the inner housing is inserted into the outer housing is similar to FIG. 4, and a transverse cross-sectional view showing a state in which the inner housing is inserted into the outer housing is similar to FIG. 5.

In FIG. 18, an orthodontic device 11 of the present embodiment is to be attached to an upper jaw of a patient, and includes an inner housing 15 directly covering patient's teeth, an outer housing 13 covering an outer periphery of the inner housing 15, twenty-one bracket assemblies 7 (7a1, 7c1, 7d1, 7e1, 7f1, 7g1, 7h1, 7j1, 7q1, 7c2, 7d2, 7e2, 7f2, 7g2, 7h2, 7j2, 7k2, 7m2, 7n2, 7p2 and 7q2) which penetrate the inner housing 15 and are arranged to press against patient's teeth, and seven cushioning members 9 (9b1, 9k1, 9m1, 9n1, 9p1, 9a2 and 9b2) supporting the patient's teeth on which the bracket assembly 7 is not arranged.

The orthodontic device 11 of the present embodiment and the orthodontic device 1 of the first embodiment have different outer housing and inner housing. That is, although the outer housing 3 of the first embodiment is configured to cover the entire inner housing 5 and the outer housing 13 of the present embodiment covers the inner housing 15, the outer housing 13 forms in the bottom a hole having a substantially U-shape in a plan view so that the bottom of the inner housing 15 may be inserted.

When the inner housing 15 of the present embodiment is inserted into the outer housing 13, both bottom surfaces of the inner housing 15 and the outer housing 13 are arranged on the same plane.

Therefore, the orthodontic device 11 of the present embodiment may shorten the height of the orthodontic device as compared with the orthodontic device 1 of the first embodiment, and the entire orthodontic device may be made compact. Therefore, it is capable of reducing discomfort felt by the patient when it is mounted on the patient's teeth.

Third Embodiment

Next, a third embodiment of the present disclosure will be described. FIG. 19 is a vertical sectional view of an orthodontic device of a third embodiment.

In addition, portions common to the first embodiment will be denoted by the same reference numerals, descriptions of the portions will be omitted in the present embodiment. An overall plan sectional view of the orthodontic device 21 of the present embodiment is similar to FIG. 1, a plan view showing a state in which the inner housing is inserted into the outer housing is similar to FIG. 4.

In the present embodiment, a tooth e, and a bracket assembly 7e1 and a bracket assembly 7e2 (see FIG. 1) disposed for the tooth e will be described as an example.

In the present embodiment, the bracket assembly 7e1 includes a bracket 8e1, a spring 6e1, a screw 2e1, a stopper 4e1, and a cushioning member 9e1.

Further, the bracket 8e1 includes a bottom portion 8ea1, a cylindrical portion 8eb1, a flange portion 8ec1, and a protruding portion 8ed1. The screw 2e1 includes a screw head portion 2ea1 and a screw shaft portion 2eb1.

On the other hand, the bracket assembly 7e2 in the present embodiment includes a bracket 8e2, a spring 6e2, a screw 2e2, a stopper 4e2, and a cushioning member 9e2.

Further, the bracket 8e2 includes a bottom portion 8ea2, a cylindrical portion 8eb2, a flange portion 8ec2, and a protruding portion 8ed2. The screw 2e2 includes a screw head portion 2ea2 and a screw shaft portion 2eb2.

In FIG. 19, an orthodontic device 21 of the present embodiment is to be attached to an upper jaw of a patient, and includes an inner housing 15 directly covering patient's teeth, an outer housing 13 covering an outer periphery of the inner housing 15, twenty-one bracket assemblies 7 (7a1, 7c1, 7d1, 7e1, 7f1, 7g1, 7h1, 7j1, 7q1, 7c2, 7d2, 7e2, 7f2, 7g2, 7h2, 7j2, 7k2, 7m2, 7n2, 7p2 and 7q2) which penetrate the inner housing 15 and are arranged to press against patient's teeth, and seven cushioning members 9 (9b1, 9k1, 9m1, 9n1, 9p1, 9a2 and 9b2) supporting the patient's teeth on which the bracket assembly 7 is not arranged.

In the bracket 8 of the orthodontic device 21 of the present embodiment, the brackets 8e1 and 8e2 have different heights. That is, the bracket 8e1 in FIG. 19 presses the lower part of the tooth e, whereas the bracket 8e2 presses the upper part of the tooth e higher than the pressing position of the bracket 8e1.

Which position of the tooth is to be pressed depends on the condition of the tooth to be corrected, for example, as in the present embodiment, the outer bracket assembly may press higher position than that of the inner bracket assembly. In some cases, the outer bracket assembly may press lower position than that of the inner bracket assembly.

According to the orthodontic device 21 of the present embodiment, since a plurality of the brackets 8 are provided for each tooth, and at least one bracket 8 has a height different from that of the other brackets 8 with respect to the tooth, a dentist or a dental technician is capable of easily manufacturing the orthodontic device improving orthodontic effect of the patient's teeth by changing a pressing position of the bracket for each tooth of the patient, and patients are capable of more easily adjusting their own teeth by the orthodontic device.

Fourth Embodiment

Next, a third embodiment of the present disclosure will be described. FIG. 20 is a components diagram of a pressing force adjusting mechanism in an orthodontic device of a fourth embodiment.

In addition, portions common to the first embodiment will be denoted by the same reference numerals, descriptions of the portions will be omitted in the present embodiment. An overall plan sectional view of the orthodontic device 31 of the present embodiment is similar to FIG. 1, a plan view showing a state in which the inner housing is inserted into the outer housing is similar to FIG. 4.

In FIG. 20, an orthodontic device 31 of the present embodiment is to be attached to an upper jaw of a patient, but the shape of the bracket is different from that of the bracket 7 of the first embodiment.

A bracket 18 of the present embodiment is a circular component in plan view, and has a bottom portion 18a longer than the bottom portion 8a of the first embodiment, a cylindrical portion 18b, a disc-shaped flange portion 18c having a larger outer diameter than that of the cylindrical portion 18b, and a protruding portion 18d extending coaxially with the cylindrical portion 18b from the bottom portion 18a.

The bracket 18 of the present embodiment adjusts the distance between the patient's tooth and the inner housing by polishing the bottom portion 18a of the bracket 18, which improves convenience in adjusting the orthodontic device.

The material of the bracket 18 is similar to that of the bracket 8, it is not particularly limited as long as it is metal material or synthetic polymer made of biocompatible material, for example, metal material such as titanium alloy, cobalt alloy and stainless steel or synthetic polymer material such as nylon, polypropylene, polyethylene terephthalate or Teflon (registered trademark) may be used. Titanium alloy is used in this present embodiment.

According to the orthodontic device 31 of the present embodiment, since it is capable of adjusting the pressing force of the bracket 8 on the teeth by adjusting a length of a bottom portion 18a of the bracket 8, the pressing force adjusting mechanism may be manufactured more easily.

Fifth Embodiment

Finally, a fifth embodiment of the present disclosure will be described. FIG. 21 is a components diagram of a pressing force adjusting mechanism in an orthodontic device of a fifth embodiment.

In addition, portions common to the first embodiment will be denoted by the same reference numerals, descriptions of the portions will be omitted in the present embodiment. An overall plan sectional view of the orthodontic device 41 of the present embodiment is similar to FIG. 1, a plan view showing a state in which the inner housing is inserted into the outer housing is similar to FIG. 4.

In FIG. 21, an orthodontic device 41 of the present embodiment is to be attached to an upper jaw of a patient, but the shape of the screw is different from that of the screw 2 of the fourth embodiment.

A screw 12 of the present embodiment includes a screw head portion 12a, a screw shaft portion 12b, and a bulge portion 12c formed in the middle of the screw shaft portion 12b are integrally formed, and the bulge portion 12c presses or releases the spring 6.

The screw 12 of the present embodiment has an outer diameter smaller than that of the screw head 2a of the first embodiment so that the screw head 12a may be inserted into the hole of the outer housing 3.

The material of the screw 12 is similar to that of the screw 2, it is not particularly limited as long as it is metal material or synthetic polymer made of biocompatible material, for example, metal material such as titanium alloy, cobalt alloy and stainless steel or synthetic polymer material such as nylon, polypropylene, polyethylene terephthalate or Teflon (registered trademark) may be used. Titanium alloy is used in this present embodiment.

According to the orthodontic device 41 of the present embodiment, since the screw 12 includes the bulge portion 12c having an outer diameter larger than an inner diameter of a screw holes 3a1 etc. of the outer housing 3 and an outer diameter of the compression spring 6 in the middle of the screw shaft portion 12b, the pressing force of the bracket 18 against the tooth may be effectively applied.

What is claimed is:

1. An orthodontic device, comprising:
   an inner housing that covers teeth,
   an outer housing spaced from the inner housing and surrounding the inner housing such that the outer housing is located on both an inner side and an outer side of the inner housing,
   a bracket that is capable of pressing against the teeth and that penetrates the inner housing, and
   a pressing force adjuster that engages with the outer housing and the bracket and that is capable of adjusting a pressing force of the bracket on the teeth.

2. The orthodontic device according to claim 1, wherein:
   the inner housing includes a plurality of first holes in a longitudinal direction,
   the outer housing includes a plurality of second holes in a longitudinal direction,
   the bracket engages with the inner housing through one of the first holes, and
   the pressing force adjuster engages with the bracket and the outer housing through one of the second holes.

3. The orthodontic device according to claim 2, wherein:
   the pressing force adjuster includes a screw screwed to the outer housing through the one of the second holes, a stopper fitted with the screw and a compression spring disposed between the stopper and the bracket, and
   the stopper has an outer diameter larger than an inner diameter of the second hole and an outer diameter of the compression spring in a middle of the screw.

4. The orthodontic device according to claim 3, wherein the stopper is attachable to and detachable from the screw.

5. The orthodontic device according to claim 4, wherein:
   the bracket is one of a plurality of brackets that are provided for each tooth, and
   at least one bracket of the plurality of brackets, at least one first hole and at least one second hole corresponding to the at least one bracket have a height different from that of other brackets, other first holes and other second holes corresponding to the other brackets of the plurality of brackets with respect to the tooth.

6. The orthodontic device according to claim 4, wherein a region of the bracket that is configured to contact a tooth has a higher surface roughness than other regions of the bracket.

7. The orthodontic device according to claim 3, wherein:
   the bracket is one of a plurality of brackets that are provided for each tooth, and
   at least one bracket of the plurality of brackets, at least one first hole and at least one second hole corresponding to the at least one bracket have a height different from that of other brackets, other first holes and other second holes corresponding to the other brackets of the plurality of brackets with respect to the tooth.

8. The orthodontic device according to claim 3, wherein a region of the bracket that is configured to contact a tooth has a higher surface roughness than other regions of the bracket.

9. The orthodontic device according to claim 3, wherein zirconia is formed in a region of the bracket that is configured to contact a tooth.

10. The orthodontic device according to claim 3, wherein:
    the bracket includes a restrictor that restricts a movement of the bracket, and
    the restrictor has an outer diameter larger than an inner diameter of the first hole around the bracket.

11. The orthodontic device according to claim 2, wherein:
    the bracket is one of a plurality of brackets that are provided for each tooth, and
    at least one bracket of the plurality of brackets, at least one first hole and at least one second hole corresponding to the at least one bracket have a height different from that of other brackets, other first holes and other second holes corresponding to the other brackets of the plurality of brackets with respect to the tooth.

12. The orthodontic device according to claim 2, wherein a region of the bracket that is configured to contact a tooth has a higher surface roughness than other regions of the bracket.

13. The orthodontic device according to claim 2, wherein zirconia is formed in a region of the bracket that is configured to contact a tooth.

14. The orthodontic device according to claim 2, wherein:
    the bracket includes a restrictor that restricts a movement of the bracket, and
    the restrictor has an outer diameter larger than an inner diameter of the first hole around the bracket.

15. The orthodontic device according to claim 1, wherein a region of the bracket that is configured to contact a tooth has a higher surface roughness than other regions of the bracket.

16. The orthodontic device according to claim 1, wherein zirconia is formed in a region of the bracket that is configured to contact a tooth.

17. The orthodontic device according to claim 1, wherein:
    the bracket includes a restrictor that restricts a movement of the bracket, and
    the restrictor has an outer diameter larger than an inner diameter of the first hole around the bracket.

18. The orthodontic device according to claim 1, wherein the pressing force adjuster is capable of adjusting the pressing force of the bracket on the teeth by adjusting a length of a bottom of the bracket.

* * * * *